United States Patent Office 3,242,036
Patented Mar. 22, 1966

3,242,036
COATING COMPOSITION COMPRISING AN INTER-
POLYMER OF ACRYLONITRILE, CYANOALKYL
ACRYLATE AND AN UNSATURATED CARBOX-
YLIC ACID
Claus Victorius, Media, Pa., assignor to E. I. du Pont de
Nemours and Company, Wilmington, Del., a corpora-
tion of Delaware
No Drawing. Filed Dec. 31, 1962, Ser. No. 248,208
17 Claims. (Cl. 161—215)

This invention relates to aqueous dispersion copolymer compositions whereof the copolymer is a polymerization product of a comonomer composition having a preponderant proportion of cyano moiety provided by a plurality of mono-cyano-substituted alpha,beta mono-olefinically-unsaturated monomers including (a) acrylonitrile and (b) at least one cyano alcohol ester of an alpha,beta mono-olefinically-unsaturated carboxylic acid, the remaining comonomers of the monomer composition being (c) at least one other alpha,beta mono-olefinically-unsaturated monomer free of cyano moiety and copolymerizable with (a) and (b) and including at least one alpha, beta mono-olefinically-unsaturated carboxylic acid. The invention further relates to hydrophobic substrate having a surface coating comprising the defined copolymer which is at least ternary in composition, especially coated electrical conductors, and to laminates having the defined copolymer as the adhesive layer contiguous with the respective plies.

Rubber-like polymers of esters of alpha-cyano-substituted monohydric alcohols and alpha,beta unsaturated carboxylic acids are taught by Harmon et al. U.S. Patent 2,379,297. Rubbery copolymers of these cyano esters with vinyl esters, esters of acrylic acid and methacrylic acid, and conjugated diene monomers, e.g. butadiene-1,3 and substituted butadiene-1,3 are also disclosed in this patent.

Copolymers of acrylonitrile and esters of monohydric alkyl alcohols and alpha,beta mono-olefinically-unsaturated monocarboxylic acids such as acrylic acid and methacrylic acid are disclosed in U.S. Patents 2,787,561; 2,787,603; 2,866,763; 3,032,521 and 3,069,375 as being useful as coating compositions, particularly as an insulating coating on an electrical conductor.

It has now been discovered in accordance with the present invention that replacement of the unsubstituted acrylate or methacrylate ester monomer components of these prior acrylonitrile copolymers wholly or in part sufficiently to provide a significant contribution of cyano moiety as hereinafter defined provides advantageous improvements in thermal and chemical resistance properties of the coating compositions deposited from the resulting aqueous dispersion copolymer composition. The primary advantages reside in improved resistance toward "Freon" fluorinated hydrocarbon refrigerants and improved thermal and heat-aging characteristics of the cured coating.

The aqueous dispersion copolymer compositions of this invention are the products of aqueous dispersion copolymerization of monomer compositions each consisting essentially of a plurality of alpha,beta mono-olefinically-unsaturated monomers, at least ternary in composition, made up of (a) acrylonitrile, (b) at least one ester of a mono-cyano monohydric alcohol having 1 to 6 carbon atoms in the divalent saturated aliphatic hydrocarbon radical to which the hydroxyl moiety and cyano moiety are linked and acrylic acid or alpha-substituted acrylic acid, and (c) at least one other alpha,beta mono-olefinically-unsaturated monomer copolymerizable with comonomers (a) and (b) and being free of cyano moiety, and essentially including at least one such monomer which provides carboxylic acid moiety, the comonomers (a) and (b) making up 70 to 99 mol percent of the monomer composition with comonomer (a) providing at least 50 mol percent, preferably from about 60 to about 80 mol percent, and comonomer (b) providing at least 10 mol percent, preferably 15 to 25 mol percent, said monomer component (c) making up the remaining 1 to 30 mol percent and providing from 1 to 10 mol percent of carboxylic acid moiety. Within the indicated range of molar proportion, the proportions of the contributing comonomers are such that the resulting copolymer preferably has the following composition on a weight basis:

| | Percent |
|---|---|
| (a) Polymerized acrylontrile | 45 to 70 |
| (b) Polymerized cyano ester | 25 to 50 |
| (c) Other non-cyano comonomers as defined | 2 to 30 | including polymerized carboxylic acid sufficient to provide carboxylic acid moiety equivalent to 2 to 10 percent as monocarboxylic acid.

In order that the copolymer exhibits significant advantages over the acrylonitrile copolymers defined by the aforementioned patents, the copolymer must contain at least 70 mol percent of cyano moiety based on the mols of comonomers (a) and (b) making up the copolymer. Of this content, at least 50 mol percent of the cyano moiety is provided by (a) acrylonitrile, the remaining content of cyano moiety, which may total up to 99 mol percent, being provided by the defined cyano alcohol ester (b). In providing an effective contribution, the cyano alcohol ester is present in a proportion which provides at least 10 mol percent of cyano moiety.

The cyano alcohol ester monomer (b) is more specifically defined as an ester of a cyano alcohol having the general formula H—O—R—CN where —R— is a divalent saturated aliphatic hydrocarbon radical having 1 to 6 carbon atoms and an alpha,beta mono-olefinically-unsaturated monocarboxylic acid having the general formula

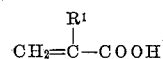

where —R¹ is a monovalent substituent free of polymerizable unsaturation, e.g. H—, CH₃—, C₂H₅—, and phenyl. The cyano ester is represented by the general formula

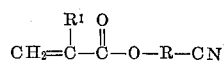

where —R— and R¹— are as defined above. The cyano moiety of the cyano alcohol may be joined to any one of the carbon atoms of the divalent radical —R—, e.g. linked to the alpha carbon atom, the beta carbon atom, gamma carbon, or even the omega carbon atom. The radical —R— may be straight chain, branched chain, cyclic or acyclic hydrocarbon. Preferably there are 2 to 4 carbon atoms making up the radical —R—. The monocarboxylic acid component of the cyano ester preferably is acrylic acid or methacrylic acid. Cyanoethyl acrylate, cyanopropyl acrylate and cyanobutyl acrylate each having the cyano moiety linked to a terminal carbon of the radical —R— are especially preferred cyano esters, i.e. comonomer (b).

Comonomer (c) is free of cyano moiety and can be any alpha,beta mono-olefinically-unsaturated monomer which is copolymerizable with monomers (a) and (b) and which is of relatively low molecular weight such that the percent by weight contribution is not significantly disproportionate relative to the molar contribution. Comonomer (a) at least includes a monomer which provides carboxylic acid moiety —COOH in a proportion of at least one mol percent based on the total mols of comonomers (a), (b) and (c). The maximum proportion of carboxylic acid comonomer is that which provides about 10 mol percent of the carboxylic acid moiety. Proportions significantly higher than 10 mol percent of the acid monomer lead to copolymers which exhibit significant solubility in water. The acid comonomer may be monocarboxylic, dicarboxylic or even tricarboxylic. Partial esters of polycarboxylic acids can be used to provide the carboxylic acid moiety. Typical useful carboxylic acid comonomers are: acrylic, methacrylic, ethacrylic, phenylacrylic, crotonic, itaconic, maleic, fumaric acids and monohydric alcohol partial esters of itaconic, maleic or fumaric acids. Preferred carboxylic acids are acrylic acid, methacrylic acid, and itaconic acid which are further characterized as alpha,beta mono-olefinically-unsaturated acids having 3 to 5 carbon atoms per molecule and having a terminal methylene group, i.e. $CH_2=C<$ vinyl unsaturation.

Neutral alpha,beta mono-olefinically-unsaturated monomers free of cyano moiety, preferably having a terminal methylene group may supplement the carboxylic acid monomer in providing the comonomer (c). These neutral monomers may be full esters of the aforementioned acids and a lower saturated aliphatic monohydric alcohol, e.g. acrylic and methacrylic acid esters of $C_1$ to $C_8$ alcohols. Hydrocarbon monomers, e.g. styrene, vinyltoluene and alpha methylstyrene, can be used to supplement the carboxylic acid monomer. If it is desirable to provide the copolymer with a potentially reactive 1,2-oxirane moiety, an ester of 2,3-epoxypropanol-1 and an unsaturated carboxylic acid as defined may be used. Such glycidol esters are disclosed in U.S. Patent 2,787,561.

Any of the aqueous dispersion polymerization techniques described in U.S. Patents 2,787,561; 2,787,603; 2,866,763; 3,032,521 and 3,069,375 can be used in preparing the aqueous dispersion copolymer compositions of this invention. The proportion of the comonomer composition in the polymerization recipe can range from 10% to 60%, preferably 25% to 50%. Any of the polymerization initiators, surfactants, emulsifiers, or suspending agents disclosed therein can be used in the effective proportions recited in these reference patents. Likewise, the operative conditions disclosed therein are effective in preparing the latexes of this invention. The resulting latex is characterized by the colloidally dispersed copolymer particles having an average particle diameter in the range of about .05 to .30 micron. The relative viscosity of the copolymer, based on a 0.5% solution in dimethyl formamide is usually in the range of 2.5 to 10. The weight average molecular weight of the copolymer is usually in the range of 250,000 to 5,000,000 as determined by light scattering technique.

The resulting latexes can be used as coating compositions, adhesives, and impregnants. For the purpose of enhancing coalescence of the colloidal particles of the dispersed copolymer to a continuous film or coating, water-miscible solvents for the copolymer or water-dispersible resins or soluble resins can be blended with the aqueous dispersion of the copolymer as disclosed in the aforementioned patents, using effective proportions as disclosed. Tetramethylene sulfone, cyclic ethylene carbonate, dimethyl formamide, dimethyl acetamide, diacetone alcohol, water-soluble alkyl monoethers of ethylene glycol and water-soluble alkyl monoethers of diethylene glycol are typical species of water-soluble, volatile, organic liquid solvents having a rate of volatilization less than that of water which can be used as solvent-type coalescing agents for the water-insoluble copolymer in proportions up to 150% based on the weight of the dispersed copolymer. Water-dilutable, heat-reactive aldehyde condensation resins such as phenol/formaldehyde resin, urea/formaldehyde resin, melamine/formaldehyde resin, urea/melamine/formaldehyde resin, benzoguanamine/formaldehyde resin, ketone/formaldehyde resin and mixtures thereof are typical film-forming materials which can be used to enhance coalescence of the cyano-substituted copolymer as well as to provide other useful advantages when used in proportions in the range of from about 2% to about 40% based on the weight of the copolymer. For some non-electrical uses, e.g. as an adhesive, the copolymer can be usefully combined with higher proportions of phenol/formaldehyde resin, i.e. up to equal parts. A range of 40 to 100 parts of the phenolic resin per 100 parts of the copolymer is particularly useful in adhesive formulations.

As a coating composition, the aqueous dispersion copolymer composition may be used unpigmented to provide clear coatings or pigmented in usual proportions to provide opaque and colored coatings.

While the aqueous dispersion of the copolymer having cyano and carboxylic acid moieties can be used in its acid state, usually in the pH range of 3 to 5, the acidic dispersion, for the reason of improved stability in the aqueous state, is ammoniacally adjusted to a pH of at least 5.5, preferably in the range of 6.5 to 8. At the time of use, the dispersion may be further adjusted to a pH up to 10. Although ammonium hydroxide is preferably used to neutralize the carboxylic acid moieties of the copolymer and thereby form a water-dispersible salt thereof, volatile, water-soluble amines can be used in lieu thereof to form water-dispersible copolymer salts.

Aqueous dispersion copolymer compositions of this invention equivalent to the aqueous dispersions of Interpolymers A, B, C and D of U.S. Patent 2,787,603, except that the butyl acrylate comonomer thereof is replaced with a cyano alcohol ester as defined herein for comonomer (b), yield improved results in reference to "Freon" fluorocarbon refrigerants, thermal properties, and dielectric life when formulated as an insulating enamel in accordance with the teachings of Examples I to V of the identified patent. In carrying out the evaluation of the cured insulation applied to wire and to glass fabric recognized tests as described in columns 4–5 of U.S. Patent 2,787,603 are used.

The following specific examples are provided to illustrate the principles and practice of the invention, but the scope of the invention is not limited to the exact details of these typical examples. Unless otherwise indicated, the parts and percentages are given by weight.

EXAMPLE 1a

First portion: Parts by weight
Aqueous ferrous sulfate solution, 0.0272%
$FeSO_4$ _____ 17.6
"Ludox" LS colloidal silica, 30% _____ 15.0
Water, deionized _____ 1535.0

Second portion:
(a) Acrylonitrile containing 25 p.p.m. MEHQ _____ 522.0
(b) 2 - cyanoethyl acrylate containing 50 p.p.m. MEHQ _____ 333.0
(c) Methacrylic acid containnig 250 p.p.m. MEHQ _____ 45.0

Third portion:
Ammonium persulfate _____ 2.97
Sodium meta bisulfite _____ 0.74
Deionized water _____ 196.60

2667.91

The comonomer charge, i.e. the second portion, per 100 parts by weight consists of 58 parts of (a) acrylonitrile, (b) 37 parts of cyanoethyl acrylate, and (c) 5 parts of methacrylic acid. These proportions on a molar basis are:

Mol percent
(a) Acrylonitrile _____ 75.5
(b) Cyanoethyl acrylate _____ 20.5
(c) Methacrylic acid _____ 4.0

100.0

These monomers can be used with the ordinary stabilizing proportions of inhibitor present or used in the inhibitor-free state. Ordinarily, the inhibitors are not removed. The designation MEHQ refers to methyl ether of hydroquinone which is present as inhibitor. Hydroquinone is another inhibitor ordinarily used.

The "Ludox" LS colloidal silica has a silica content of 30% and is characterized by a $SiO_2/Na_2O$ ratio of 285:1, particle diameter of about 15 millimicrons, and a surface area of about 210 square meters per gram of silica. Other useful grades are disclosed in U.S. Patent 3,069,375.

The deionized water is characterized by resistivity of at least 3 megohms.

The reaction vessel is a 3 liter, 3-necked glass flask equipped with a glass stirrer, a thermometer, a graduated charging funnel, and a condenser. The flask is jacketed with a means for temperature control.

The first portion, premixed and containing $FeSO_4$ in sufficient amount to provide 1 p.p.m. of Fe based on the water content, is charged into the reaction vessel and one-half of the second portion, premixed, is added and blended therewith. The remaining half of the second portion is transferred to the charging funnel. The initial charge of combined first portion and half second portion is heated to about 50° C. At this temperature about one-half of the third portion is added to the initial charge to initiate polymerization, controlling the temperature to not significantly greater than 65° C. Polymerization is continued for about 60 minutes, the exothermic reaction being complete as indicated by a drop in temperature. Then the remaining half of the second portion and the remaining half of the third portion are rapidly added to the first stage reaction product and the reaction temperature is maintained within the range of about 65° C. to 76° C., the temperature beginning to decrease without applied cooling about 25 minutes after the completion of the comonomer addition. Heat is then applied to hold the temperature at 75° C. to 76° C. and the rate of stirring is reduced to below the initial moderate agitation, the reaction mixture being held under these conditions for about 60 minutes and then cooled to room temperature of about 25° C. The resulting aqueous dispersion product having a pH of 3.1 is adjusted to a pH of 5.7 by the addition of about 8.9 parts of 6 N ammonium hydroxide. The non-volatile content of the product is 32.0% and the product yield is about 98.1%.

A wire enamel composition is prepared from the resulting copolymer dispersion as follows.

*Wire enamel*

| First portion: | Parts by weight |
|---|---|
| Aqueous dispersion copolymer composition, 32% | 2000 |
| Deionized water | 300 |
| Ammonium hydroxide, 28% | 17.2 |
| Second portion: Aqueous phenol/formaldehyde resin, 66.4% resin | 103.8 |
| | 2421.0 |

The ingredients of the first portion are mixed, the pH of the mixture being about 7.6. Then the second portion is blended with the premixed first portion. The resulting wire enamel composition has a solids content of about 28.45% which in 100 parts thereof consists essentially of 90 parts of the copolymer and 10 parts of the phenol/formaldehyde resin. Bakelite's BRL-1100 and BR-15100 which are aqueous phenol/formaldehyde resin compositions having a resin content of about 66% are especially useful as the modifying resin component for the copolymer. The final enamel is characterized by a pH of 7.3 and a viscosity of 13 cps. at 25° C. using a Brookfield viscosimeter with a No. 1 spindle at 6 r.p.m.

For wire-coating on a commercial type wire-coating machine, the described wire enamel composition is blended per 1000 parts thereof with 45 parts of 28% aqueous ammonium hydroxide and sufficient amount of deionized water to a final non-volatile coating solids content of about 20%. This aqueous enamel is coated on #18 gauge copper which is annealed at a temperature of 457° C. prior to immersion in the coating bath. Coating is at a speed of 35 feet per minute and the enamel on the wire is cured by passage through a curing oven in which the temperature ranges from 233° C. up to a peak of 302° C., the oven being 12 feet in length. The wire is passed repeatedly through the coating bath and oven until the increase in diameter of the coated wire over the uncoated wire is 3.1 mils, i.e., the insulation is about 1.55 mils thick.

Comparative coated wire is prepared under the same conditions using as the comparative enamel, Comparative Latex A modified with 10 parts of phenol/formaldehyde resin per 90 parts of the copolymer. The enamel being ammoniacally adjusted and diluted for coating as described in Example 1a.

COMPARATIVE LATEX A

The recipe and polymerization technique for the preparation of this comparative latex are the same as described in the following Example 2 except that butyl acrylate is used in place of the 2-cyanoethyl acrylate in the comonomer composition. Alternatively, this comparative latex may be prepared by following the teachings of Examples 1 and 2 or the Comparative Products A and B described in Table 2 of U.S. Patent 3,069,375 or by following the teachings of Example I of U.S. Patent 2,787,603 in reference to the preparation of the latex of Interpolymer A described therein.

In general, the appearance of the wire coated with the Example 1a wire enamel and the performance thereof in reference to electrical properties are comparable with that of the comparative coated wire except in reference to thermal properties. The wire coated with the enamel formulated with the copolymer latex of Example 1a exhibits a distinct thermal advantage. The average cut-through temperature is about 201° C. versus 162° C. for the comparative wire. The abrasion resistance, based on G.E. scrapes, is about 126 versus 45 for the comparative enamel. Another important advantage is the resistance toward "Freon" fluorocarbon refrigerants. Coated wires are immersed in liquid "Freon" 22 at room temperature for 16 to 18 hours, i.e., overnight, and then examined for yellowing and blistering. The wires coated with the comparative enamel are deeply yellowed and show small, clear bisters. Wires coated with the enamel from Example 1a exhibit no change in color and no blistering as a result of the immersion in "Freon" 22, monochlorodifluoromethane.

In another "Freon" 22 resistance test to determine the relative rate of yellowing, a coiled, five-foot length of coated wire is immersed in the refrigerant overnight in an aerosol tube. Thereafter, the tube is cooled by immersion in a Dry Ice/acetone bath and the treated coil is removed and immediately connected to a high amperage/low voltage transformer with a 32 ampere current being passed through the wire until the enamel is yellowed or burns up, measuring the time required for the color of the enamel on the entire coil to turn yellow. The comparative wire enamel yellows in a period of 15 to 20 seconds, the color becoming a deep yellow tan with small blisters. The Example 1a wire enamel does not exhibit yellowing during the test period of 60 seconds and is free of blisters. The Example 1a enamel exhibits significantly greater retention of the original dielectric strength after exposure to the "Freon" 22 refrigerant.

Under ordinary high temperature curing of the wire enamel during application, the Example 1a wire enamel composition provides a cured enamel which is lighter in color than that of the comparative enamel.

Another indication of the thermal advantage is increased dielectric life. This is a measure of the time in hours for the dielectric strength to drop to 1000 volts from the initial dielectric strength. Specimens of coated wire for which the initial dielectric strength has been determined are placed in circulating air ovens at at least three different temperatures and permitted to age for various intervals, the test intervals being sufficient in length that some specimens drop below 1000 volts in dielectric strength, and the oven temperatures being so selected that the test period ordinarily is in the range of from about 60 to about 2000 hours in effecting the indicated drop in dielectric strength. The wire enamel of Example 1a having an initial dielectric strength of about 3050 volts exhibits a dielectric life of about 170 hours at 240° C., about 500 hours at 220° C., and about 1500 hours at 200° C. These data extrapolated to 160° C. register a dielectric life of about 20,000 hours and extrapolated to 250° C., the dielectric life is about 100 hours. The comparative wire enamel from Comparative Latex A having an initial dielectric strength of about 2850 volts exhibits a dielectric life of about 120 hours at 220° C., about 240 hours at 200° C., and about 900 hours at 160° C. These data extrapolated to 250° C. represent a dielectric life of about 50 hours.

EXAMPLE 1b

The recipe and polymerization technique for the preparation of this latex are identical with those of Example 1a, except that 4-cyanobutyl acrylate is substituted for the 2-cyanoethyl acrylate. The composition of the comonomer mixture is:

|  | Mol percent |
|---|---|
| (a) Acrylonitrile | 78.4 |
| (b) 4-cyanobutyl acrylate | 17.4 |
| (c) Methacrylic acid | 4.2 |
|  | 100.0 |

The characteristics of the resulting copolymer latex are comparable with those of the latex of Example 1a. This Example 1b latex blended with the phenol/formaldehyde in the proportions of 90 parts of the phenolic resin as described in Example 1a provides a wire enamel composition which performs in the same manner as the wire enamel of Example 1a.

EXAMPLE 1c

The recipe and polymerization technique for the preparation of this latex are identical with those of Example 1a, except that 3-cyanopropyl acrylate is substituted for the 2-cyanoethyl acrylate. The composition of the comonomer mixture is:

|  | Mol percent |
|---|---|
| (a) Acrylonitrile | 77.1 |
| (b) 3-cyanopropyl acrylate | 18.8 |
| (c) Methacrylic acid | 4.1 |
|  | 100.0 |

The characteristics of this copolymer latex and the performance when formulated as a wire enamel as described are comparable with those of Examples 1a and 1b, i.e. they exhibit a significant advantage over the comparative enamel from Comparative Latex A.

EXAMPLE 2

| First portion: | Parts by weight |
|---|---|
| Aqueous FeSO₄ 0.0272% | 17.6 |
| "Ludox" LS colloidal silica, 30% | 15.0 |
| Water, deionized | 1535.0 |
| Second portion: |  |
| (a) Acrylonitrile | 482.6 |
| (b) 2-cyanoethyl acrylate | 245.1 |
| (c) Methacrylic acid | 38.3 |
| Third portion: |  |
| Ammonium persulfate | 2.10 |
| Sodium meta bisulfite | 0.66 |
| Water, deionized | 197.0 |
|  | 2533.36 |

The comonomer charge per 100 parts by weight consists of 63 parts (a) acrylonitrile, 32 parts (b) cyanoethyl acrylate, and 5 parts of (c) methacrylic acid. These proportions on a molar basis are:

|  | Mol percent |
|---|---|
| (a) Acrylonitrile | 79.2 |
| (b) Cyanoethyl acrylate | 17.0 |
| (c) Methacrylic acid | 3.8 |
|  | 100.0 |

The comonomers are inhibited as indicated in Example 1.

The procedure for the polymerization is essentially the same as defined in Example 1a, which may be referred to as the divided batch or two-stage process, i.e. about one-half of the comonomer charge is added initially and the remaining half is added after polymerization of the first stage is substantially complete. At the end of the first stage, polymerization is about 91.5% complete conversion of the monomers. Conversion is 97.3% at the end of the second stage. The resulting dispersion is characterized by a pH of 4.2. Addition of about 3.7 parts of 6 N ammonium hydroxide raises the pH to about 5.7. The resulting dispersion has a copolymer content of 33.13%. This latex is formulated as a wire enamel as described in Example 1a by blending 2000 parts of the latex with 300 parts of deionized water and 9.5 parts of 28% ammonium hydroxide, the resulting pH being about 7.6, and then blending therewith 110.9 parts of aqueous phenol/formaldehyde resin, 66.4%, and 162.8 parts of water. The resulting aqueous dispersion enamel has a non-volatile content of about 28.5% which per 100 parts consists of 90 parts of the copolymer and 10 parts of the modifying resin. The pH of the final product is about 6.9.

Copper wire, #18 gauge, is coated with the above-described wire enamel composition which is prepared for application by addition of amonium hydroxide and by aqueous dilution as described in Example 1a. This coated wire is evaluated as described in Example 1a. Results comparable with those registered by the Example 1a wire enamel are obtained. Except for the advantageous improvement in thermal characteristics and resistance to fluorohydrocarbon refrigerants, e.g "Freon" 22 refrigerant, the electrical properties are comparable with those of the comparative wire enamel specified in Example 1a. This wire enamel having an initial dielectric strength of about 2910 volts exhibits a dielectric life of about 50 hours at 250° C., about 400 hours at 220° C., and about 1500 hours at 200° C. These data extrapolate to about 40,000 hours at 160° C. This wire enamel does not yellow or blister under the described "Freon" 22 refrigerant tests. The cut-through temperature is about 212° C.

EXAMPLE 3a

| First portion | Parts by weight |
|---|---|
| Aqueous ferrous sulfate solution, FeSO₄, 0.0272% | 12.0 |
| Deionized water | 1273.0 |
| Surfactant solution, 25% | 16.0 |
| Second portion: |  |
| (a) Acrylonitrile | 600.0 |
| (b) 2-cyanoethyl acrylate | 160.0 |
| (c) Methacrylic acid | 40.0 |
| Third portion: |  |
| Ammonium persulfate, 98% assay | 1.19 |
| Sodium meta bisulfite, 98.5% assay | 0.37 |
| Deionized water | 100.00 |

EXAMPLE 3a (Continued)

Fourth portion: Parts by weight
- Ammonium persulfate, 98% assay _____ 1.19
- Sodium meta bisulfite, 98.5% assay _____ 0.37
- Surfactant solution, 25% _____ 16.00
- Deionized water _____ 88.00

2308.12

The surfactant solution is a 25% aqueous solution of dodecylbenzene sodium sulfonate. This is conveniently prepared by diluting "Santomerse" SX (30%) to 25% concentration with distilled water.

The comonomer combination, i.e. the second portion, has the following composition per 100 parts by weight:

|  | Parts by wt. | Mol percent |
|---|---|---|
| (a) Acrylonitrile | 75 | 85.8 |
| (b) 2-cyanoethyl acrylate | 20 | 10.4 |
| (c) Methacrylic acid | 5 | 3.8 |
|  | 100 | 100.0 |

NOTE.—These monomers contain MEHQ as inhibitor.

The polymerization technique is essentially the same as described in Example 1a. One-half of the second portion is added to the first portion, followed by addition thereto of the third portion to initiate the first stage polymerization. When the first stage polymerization is about 90% complete, the remaning half of the second portion is added, followed by addition of the fourth portion to initiate the second stage of polymerization. At the end of the reaction, the aqueous dispersion has a pH of 4.0 which is raised to 5.7 by addition of about 4.5 parts of 6 N ammonium hydroxide. The copolymer content of this neutralized dispersion is 34.0%.

Alternatively, the second portion can be charged at a uniform rate, e.g. at a rate of about 12 parts per minute, and, concurrently therewith, the combined third and fourth portions can be charged at a uniform rate, e.g. at a rate of about 5 parts per minute.

EXAMPLE 3b

The recipe and the polymerization technique for the preparation of this aqueous dispersion copolymer composition is essentially the same as described in Example 3a except that the second portion, i.e. the 800 parts of comonomer combination, has the following composition per 100 parts:

|  | Parts by wt. | Mol percent |
|---|---|---|
| (a) Acrylonitirle | 65 | 80.5 |
| (b) 2-cyanoethyl acrylate | 30 | 15.7 |
| (c) Methacrylic acid | 5 | 3.8 |
|  | 100 | 100.0 |

The resulting latex at the end of the reaction has a pH of 3.9 which is increased to 5.7 by the addition of about 5.9 parts of 6 N ammonium hydroxide. The copolymer content of the neutralized latex is 34.4%. This latex is detectably more stable than that of Example 3a which has a lower content of polymerized cyanoethyl acrylate.

COMPARATIVE LATEX B

The recipe and polymerization technique for this latex is essentially the same as that of Examples 3a and 3b except that the 800 parts of the second portion, i.e. the comonomer combination has the following composition per 100 parts by weight:

- Acrylonitrile _____ 75
- Butyl acrylate _____ 20
- Methacrylic acid _____ 5

100

Each of the latex compositions of Examples 3a and 3b exhibit the thermal advantages of the latexes of Examples 1a, 1b, 1c and 2 which permit their use in formulating wire enamel compositions. These thermal properties also permit these latexes to be used as the essential component of heat-resistant adhesives.

An adhesive composition I is prepared as follows.

First portion: Parts by weight
- Example 3a latex, 34% _____ 73.5
- Aqueous 6 N ammonium hydroxide _____ 0.6

Second portion:
- Aqueous phenol/formaldehyde resin, 66% ____ 37.9
- Aqueous 6 N ammonium hydroxide _____ 8.0
- Deionized water _____ 5.3

125.3

The ammonium hydroxide in the first portion is sufficient to provide a pH of about 7.0. The aqueous phenol/formaldehyde resin is Bakelite BR–15100 having a resin content of about 66% which is also used in the wire enamel formulation in Example 1a. The ammonium hydroxide in the second portion is sufficient to provide a pH of about 8.0. The resulting aqueous adhesive composition has a total non-volatile content of about 40.0% consisting of about equal proportions of the copolymer and the phenol/formaldehyde resin.

A comparative adhesive is similarly formulated, using the Comparative Latex B as follows.

First portion: Parts by weight
- Comparative Latex B, 34.7% _____ 72.0
- Aqueous 6 N ammonium hydroxide _____ 1.0

Second portion:
- Aqueous phenol/formaldehyde resin, 66% ____ 37.9
- Aqueous 6 N ammonium hydroxide _____ 4.9
- Deionized water _____ 9.6

125.4

The resulting adhesive composition has a pH of about 8.0 and a non-volatile content of about 40.0% consisting of about equal proportions of the copolymer and the phenol/formaldehyde resin.

Douglas fir plywood panels of dimensions 6" x 4" x ½" are sanded smooth and coated with the respective adhesives, using a wire-wound casting rod as the applicator. The adhesive coatings are air-dried for one hour. A second coat is superimposed and dried for one hour. A piece of "H" film, heat-resistant polyamide film resulting from the reaction of pyromellitic dianhydride with an aromatic diamine, is placed on the adhesive coated surface of each of the plywood panels to provide an exterior ply of "H" film. The assembly is placed in an electrically heated press with a silicone rubber pad between the "H" film and the heated platten to obtain uniform pressure. Laminating is conducted at a temperature of 150° C. and pressure of 50 pounds per square inch applied for a period of 16 minutes.

Aluminum panels are lightly sanded with fine emery paper and coated with a single coat of the respective adhesives which are then dried for one hour. "H" film is laminated to the aluminum in the same manner as described for laminating to the plywood.

The resulting respective laminates exhibit excellent adhesion between the "H" polyimide film and the wood and between the "H" film and the aluminum. Portions of "H" film protruding beyond the laminate tear before delamination occurs.

The resulting laminates are subjected to flame resistance tests by impinging the tip of a candle flame to the "H" film surface of the respective laminates. The respective aluminum laminates exhibit no effect of the exposure to the candle flame for 5 minutes other than having the "H" film surface smudged with soot.

The "H" film/wood laminate having the adhesive formulated with the copolymer of Example 3a develops a large single blister under the "H" film immediately after impingement of the flame. The blister does not increase in size and the "H" film does not burst under the blister pressure or burn during the flame exposure period of 5 minutes. After removal of the carbon deposit from the "H" film surface, the blister is observed to contain condensed moisture on the underside of the "H" film and that the wood at the center of the blister is charred.

The "H" film/wood laminate having the layer of adhesive formulated with the Comparative Latex B develops a medium sized blister immediately on impingement of the candle flame. In less than one minute, the blister pops violently and the gaseous products catch on fire. The wood unprotected by the "H" polyimide film ply continues to burn rather than simply char.

Adhesive compositions II, III and IV are formulated with the latex of Example 3b, using three different levels of phenol/formaldehyde resin respectively, i.e. 50/50 copolymer and phenolic resin, 60/40 copolymer and phenolic resin, and 70/30 copolymer and phenolic resin. These adhesives are prepared as indicated above, the pH being adjusted to about 8.0 and the non-volatile content being adjusted to about 40.0%.

Films of these adhesives and the Comparative Latex B adhesives prepared at the same phenolic resin levels are cast on glass using a doctor blade at a wet thickness of 10 mils. These cast films are air-dried overnight, all the films drying without cracking. These air-dried films are then baked for 30 minutes at 150° C. The resulting Example 3b copolymer/phenolic resin adhesives II, III and IV exhibit toughness and excellent adhesion to glass at the 70/30 and 60/40 levels. The adhesion is good at the 50/50 level, but the film is more brittle. The comparative adhesives in this series exhibit comparable results in reference to the indicated characteristics.

The respective coated glass panels are subjected to open flame heating by applying a Bunsen burner flame to the uncoated side of the glass to determine the ultimate heat resistance of the adhesive films. The copolymer adhesives II, III and IV slowly change color from the initial light color to a dark brown, with blisters appearing in the dark brown stage, but they do not spontaneously catch on fire. At the 70/30 level, i.e. adhesive IV, the film will burn on direct exposure to the flame, but it is self-extinguishing on removal of the flame. At the adhesive III 60/40 level and at the adhesive II 50/50 level, the films spark on direct exposure to the flame but they do not burn. The comparative adhesives at the several levels of phenolic resin content changed from the initial light color to a dark brown with exhibition of smoke in the light brown stage and blistering in the dark brown stage. At the comparative 70/30 level, blistering is severe and the film burns briefly on direct exposure to the flame. At the comparative 60/40 level, blistering is less severe but the film burns briefly on exposure to the flame. At the comparative 50/50 level, blistering is slight and the carbonized film burns very briefly.

Laminates are prepared by applying "H" polyimide film to wood, aluminum, copper, to another ply of "H" polyimide film, and to "Mylar" polyester film, using the described adhesives II, III and IV formulated with the Example 3b latex and generally following the previously described laminating technique.

All the resulting laminates exhibit good adhesion of the "H" polyimide film to the respective substrates. Of the three levels of phenolic resin proportion, the proportion of about 60 parts of the Example 3b copolymer and about 40 parts of the phenol/formaldehyde resin provides the best overall balance in performance.

EXAMPLE 4

The recipe and polymerization technique for the preparation of this aqueous dispersion copolymer composition follows that defined by Example 3a but having the following comonomer composition:

|  | Parts by wt. | Mol percent |
| --- | --- | --- |
| (a) Acrylonitirle | 63 | 80.2 |
| (b) 2-cyanoethyl acrylate | 32 | 17.2 |
| (c) Itaconic acid | 5 | 2.6 |
|  | 100 | 100.0 |

Although the itaconic acid constitutes only 2.6 mol percent of the comonomer composition, this proportion provides 5.2 mols of carboxylic acid moiety per 100 mols of comonomers.

The resulting latex and its performance are comparable with that of Example 2 which differs essentially only in the use of the monocarboxylic methacrylic acid in place of the dicarboxylic itaconic acid.

This latex formulated as a wire enamel as described in Example 1a, using the relative proportions of 90 parts of this Example 4 copolymer and 10 parts of the phenol/formaldehyde resin and coated on copper wire as described in Example 1a, provides equivalent results.

This latex formulated as an adhesive in the relative proportions, per 100 parts by weight, of 50 to 70 parts of the Example 4 copolymer and complementally 50 to 30 parts of the phenol/formaldehyde resin as described in Examples 3a and 3b, and evaluated as a laminating adhesive as described in these reference examples, provides comparable laminates which are characterized by the same advantageous thermal properties.

EXAMPLE 5

The recipe for the preparation of this dispersion copolymer composition essentially follows that defined in Examples 1a and 2, but having the following comonomer composition:

|  | Parts by wt. | Mol percent |
| --- | --- | --- |
| (a) Acrylonitrile | 35 | 55.0 |
| (b) 2-cyanoethyl acrylate | 60 | 40.1 |
| (c) Methacrylic acid | 5 | 4.9 |
|  | 100 | 100.0 |

The comonomer composition and the initiator solution are added at the same uniform rate as indicated in the alternative preparation of the Example 3a composition. The resulting latex is characterized by an initial pH of 3.4 which is adjusted to 5.7 by the addition of 6 N ammonium hydroxide after which the filtered latex has a copolymer content of 35.45%.

This latex is formulated as an insulating varnish, using the relative proportions of 90 parts of the Example 5 copolymer and 10 parts of the phenol/formaldehyde resin as described in Example 1a. This varnish composition is applied to #25 gauge copper wire and also to woven glass fabric as described in Example V of U.S. Patent 2,787,603, using a comparative insulating varnish formulated in the same proportions, using the Comparative Latex C.

COMPARATIVE LATEX C

This latex is prepared following the teachings of Example IV of U.S. Patent 2,787,603 in reference to the preparation of the latex of Interpolymer D described therein.

The electrical performance of the resulting Example 5 insulating varnish on wire and impregnating woven glass cloth is comparable with that of the indicated comparative insulating varnish C. The invention copolymer varnish provides advantageous improvement in the thermal characteristics, "Freon" fluorohydrocarbon resistance, and dielectric life.

EXAMPLE 6

The recipe and polymerization technique for the preparation of this aqueous dispersion copolymer composition follows that defined by Examples 1a and 2, but having the following comonomer composition:

|  | Parts by wt. | Mol percent |
|---|---|---|
| (a) Acrylonitrile | 63 | 79.3 |
| (b) 2-cyanoethyl acrylate | 22 | 11.6 |
| (c) Butyl acrylate | 10 | 5.2 |
| Methacrylic acid | 5 | 3.9 |
|  | 100 | 100.0 |

This latex is formulated and evaluated as a wire enamel composition as described in Example 1a. The electrical performance is comparable with that of the wire enamels formulated with the respective copolymers of the latexes of Examples 1a and 2 and of the Comparative Latex A. Although the thermal properties and "Freon" resistance are not fully equal to those of the Example 1a and Example 2 formulations, this Example 6 wire enamel formulation provides significant improvement over the Comparative A wire enamel formulation as well as over a corresponding wire enamel composition formulated with Comparative Latex D.

COMPARATIVE LATEX D

The recipe and polymerization technique for the preparation of this comparative latex are the same as that described in Example 6, but having the following comonomer composition:

|  | Parts by wt. | Mol percent |
|---|---|---|
| (a) Acrylonitrile | 63 | 79.3 |
| (b) 2-cyanoethyl acrylate | 10 | 5.3 |
| (c) Butyl acrylate | 22 | 11.5 |
| Methacrylic acid | 5 | 3.9 |
|  | 100 | 100.0 |

This comonomer composition differs from that of Example 6 only in reversal of the weight proportions of the 2-cyanoethyl acrylate and the butyl acrylate.

The characteristics of this latex and its performance is not detectably different from that of Comparative Latex A which does not have any 2-cyanoethyl acrylate present in the comonomer composition, i.e. the 5.3 mol percent of the 2-cyanoethyl acrylate does not provide a contribution sufficient to significantly alter the performance.

The comparative wire enamel D consisting essentially of 90 parts of the comparative copolymer D and 10 parts of the phenol/formaldehyde resin exhibits no significant improvement over the comparative wire enamel A.

I claim:

1. An aqueous dispersion copolymer composition comprising, as the colloidally-dispersed phase in a continuous aqueous phase, a solid copolymer of a comonomer combination consisting essentially of: (a) acrylonitrile, (b) an alpha,beta mono-olefinically-unsaturated mono-cyano-substituted ester of a mono-cyano alcohol having the general formula HO—R—CN where —R— is a divalent saturated aliphatic hydrocarbon radical having 1 to 6 carbon atoms and an alpha,beta mono-olefinically-unsaturated monocarboxylic acid having the general formula

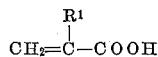

where —R¹ is a monovalent substituent free of polymerizable unsaturation, and (c) an alpha,beta mono-olefinically-unsaturated carboxylic acid free of cyano moiety, said comonomers (a) and (b) providing from 90 to 99 mol percent of the total comonomer composition with monomer (a) providing at least 50 mol percent and comonomer (b) providing at least 10 mol percent, said comonomer component (c) making up the remaining 1 to 10 mol percent and providing from 1 to 10 mol percent of carboxylic acid moiety.

2. An aqueous dispersion copolymer composition of claim 1 wherein said comonomer composition has (a) acrylonitrile present in the proportion of from about 60 to about 80 mol percent and said (b) cyano ester comonomer present in the proportion of from about 15 to about 25 mol percent.

3. An aqueous dispersion copolymer composition of claim 1 wherein said comonomer (b) is a mono-cyano alcohol ester of acrylic acid, and said comonomer (c) consists essentially of methacrylic acid.

4. An aqueous dispersion copolymer composition of claim 1 wherein said comonomer (b) is cyanoethyl acrylate.

5. An aqueous dispersion copolymer composition of claim 1 wherein said comonomer (b) is cyanopropyl acrylate.

6. An aqueous dispersion copolymer composition of claim 1 wherein said comonomer (b) is cyanobutyl acrylate.

7. An aqueous dispersion coating composition comprising the aqueous dispersion copolymer composition as defined by claim 1 and further containing a water-dispersible film-forming, heat-reactive resin selected from the group consisting of phenol/formaldehyde resin, melamine/formaldehyde resin, urea/formaldehyde resin, urea/melamine/formaldehyde resin, and benzoguanamine/formaldehyde resin.

8. A coating composition of claim 7 further containing pigment in the dispersed phase thereof.

9. As an article of manufacture, a hydrophobic substrate having a contiguous layer of dry coating resulting from depositing the aqueous dispersion composition as defined by claim 1 on said substrate and drying said applied aqueous composition.

10. As an article of manufacture, a hydrophobic substrate having a contiguous layer of dry coating resulting from depositing the aqueous dispersion coating composition as defined by claim 7 on said substrate and drying said applied coating composition.

11. An insulated electrical conductor consisting essentially of a metal conductor having an insulating layer of non-conductive coating composition consisting essentially of a copolymer of (a) acrylonitrile, (b) a cyanoalkyl acrylate having 1 to 6 carbon atoms in the alkyl moiety thereof, and (c) an alpha,beta mono-olefinically-unsaturated carboxylic acid having from 1 to 2 carboxylic acid moieties per molecule and being free of cyano moiety, said comonomers (a) and (b) making up 90 to 99 mol percent of said comonomer composition of which (a) acrylonitrile provides at least 50 mol percent and (b) said cyanoalkyl acrylate provides at least 15 mol percent, and said comonomer component (c) making up the remaining 1 to 10 mol percent and providing from 1 to 10 mol percent of carboxylic acid moiety, and 2 to 40 parts of heat-reactive phenol/formaldehyde resin per 100 parts by weight of said copolymer.

12. An insulated article of claim 11 wherein said electrical conductor is a wire and said copolymer component of said insulating layer thereon is a copolymer of: (a) acrylonitrile, (b) at least one cyanoalkyl acrylate having 2 to 4 carbon atoms in the alkyl moiety thereof, and said comonomer component (c) consists essentially of said carboxylic acid having 3 to 5 carbon atoms per molecule.

13. An insulated article of claim 12 whereof said copolymer component is a copolymer of (a) acrylonitrile, (b) 2-cyanoethyl acrylate and (c) methacrylic acid.

14. A laminate consisting essentially of at least one surface ply of an aromatic polyimide film product of pyromellitic dianhydride and an aromatic diamine, a second hydrophobic ply, and an adhesive layer between said aromatic polyimide ply and said second ply, said adhesive layer being the non-volatile content of an aqueous adhesive composition consisting essentially of the aqueous dispersion copolymer composition defined by claim 1 and 40 to 100 parts of a heat-reactive phenol/formaldehyde resin per 100 parts of said copolymer.

15. A laminate of claim 14 whereof said second ply is wood.

16. A laminate of claim 14 whereof said second ply is metal.

17. A laminate of claim 14 whereof said second ply is a polyester film of a dicarboxylic acid component consisting essentially of terephthalic acid and a dihydric component consisting essentially of ethylene glycol.

References Cited by the Examiner

UNITED STATES PATENTS

| | | | |
|---|---|---|---|
| 2,787,561 | 4/1957 | Sanders | 260—29.6 |
| 3,057,812 | 10/1962 | Straugham et al. | 260—29.6 |

MURRAY TILLMAN, *Primary Examiner.*